US011289119B1

(12) United States Patent
Benakli et al.

(10) Patent No.: US 11,289,119 B1
(45) Date of Patent: Mar. 29, 2022

(54) NOTCHED LEADING-EDGE SHIELD FOR ASSISTED MAGNETIC RECORDING HEAD

(71) Applicant: Seagate Technology LLC, Cupertino, CA (US)

(72) Inventors: Mourad Benakli, Eden Prairie, MN (US); Kirill Alexander Rivkin, Saint Cloud, MN (US); Hua Zhou, Plymouth, MN (US); Martin Giles Blaber, Minneapolis, MN (US); TaeWoo Lee, Eden Prairie, MN (US); Michael Allen Seigler, Eden Prairie, MN (US); Huaqing Yin, Eden Prairie, MN (US)

(73) Assignee: Seagate Technology LLC, Fremont, CA (US)

(*) Notice: Subject to any disclaimer, the term of this patent is extended or adjusted under 35 U.S.C. 154(b) by 41 days.

(21) Appl. No.: 16/828,030

(22) Filed: Mar. 24, 2020

Related U.S. Application Data

(60) Provisional application No. 62/823,777, filed on Mar. 26, 2019.

(51) Int. Cl.
*G11B 5/17* (2006.01)
*G11B 5/31* (2006.01)
*G11B 5/39* (2006.01)
*G11B 5/127* (2006.01)
*G11B 5/00* (2006.01)

(52) U.S. Cl.
CPC .......... *G11B 5/3912* (2013.01); *G11B 5/1278* (2013.01); *G11B 5/17* (2013.01); *G11B 5/314* (2013.01); *G11B 5/3133* (2013.01); *G11B 5/3146* (2013.01); *G11B 2005/0021* (2013.01)

(58) Field of Classification Search
None
See application file for complete search history.

(56) References Cited

U.S. PATENT DOCUMENTS

| 8,031,561 | B2 | 10/2011 | Hellwig et al. | |
|---|---|---|---|---|
| 8,351,305 | B2 | 1/2013 | Zhou et al. | |
| 9,042,209 | B2 | 5/2015 | Balamane et al. | |
| 10,839,831 | B1* | 11/2020 | Nguyen | G11B 5/4813 |
| 10,872,628 | B1* | 12/2020 | Shimazawa | G11B 5/6082 |
| 10,891,975 | B1* | 1/2021 | Bai | G11B 5/1278 |
| 10,997,988 | B1* | 5/2021 | Le | G11B 5/3146 |
| 2005/0190479 | A1* | 9/2005 | Terris | G11B 5/314 360/59 |
| 2012/0020194 | A1* | 1/2012 | Jin | G11B 5/1871 369/13.13 |
| 2014/0169146 | A1* | 6/2014 | Yin | G11B 5/1278 369/13.33 |
| 2015/0262593 | A1* | 9/2015 | Sasaki | G11B 5/4866 369/13.17 |
| 2016/0343391 | A1* | 11/2016 | Sasaki | G11B 5/3163 |
| 2017/0092304 | A1* | 3/2017 | Koizumi | G11B 5/3173 |
| 2018/0096702 | A1* | 4/2018 | Staffaroni | G11B 5/3133 |
| 2019/0066722 | A1* | 2/2019 | Maletzky | G11B 5/3133 |

* cited by examiner

Primary Examiner — Jefferson A Evans
(74) Attorney, Agent, or Firm — Mueting Raasch Group

(57) ABSTRACT

A recording head has a near-field transducer proximate a media-facing surface of the recording head. A write pole has a leading edge proximate to and facing the near-field transducer at the media-facing surface. A magnetic shield faces the leading edge of the write pole at the media-facing surface and is magnetically coupled to the write pole. The magnetic shield has a notch centered over the near-field transducer.

18 Claims, 5 Drawing Sheets

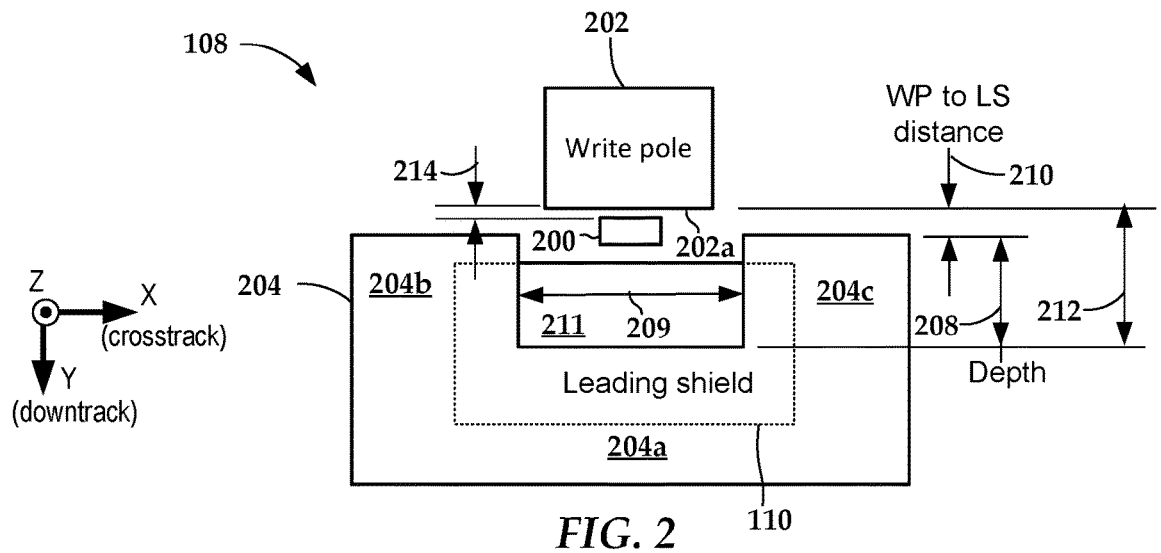
*FIG. 2*
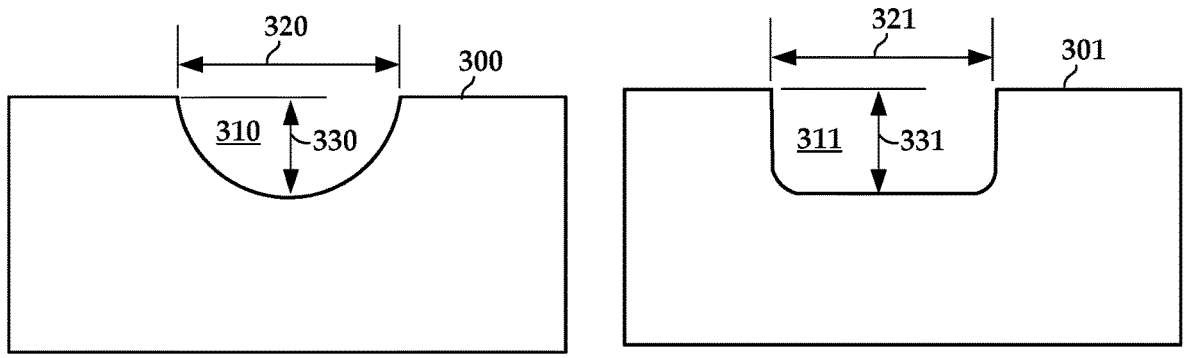
*FIG. 3*                  *FIG. 4*
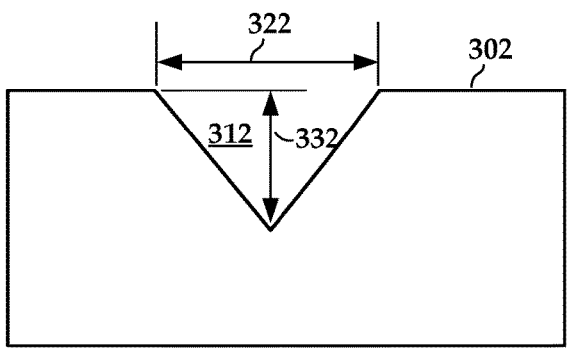     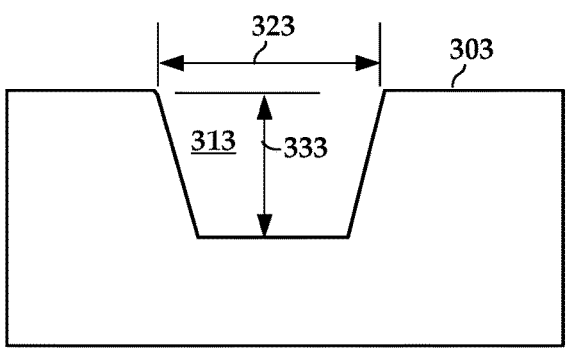
*FIG. 5*                  *FIG. 6*

NOTCHED LEADING-EDGE SHIELD FOR ASSISTED MAGNETIC RECORDING HEAD

RELATED PATENT APPLICATIONS

This application claims the benefit of Provisional Patent Application Ser. No. 62/823,777 filed on Mar. 26, 2019, which is hereby incorporated herein by reference in its entirety.

SUMMARY

The present disclosure is directed to a notched leading-edge shield for assisted magnetic recording head. In one embodiment a recording head includes a near-field transducer proximate a media-facing surface of the recording head. A write pole has a leading edge proximate to and facing the near-field transducer at the media-facing surface. A magnetic shield faces the leading edge of the write pole at the media facing surface and is magnetically coupled thereto. The magnetic shield includes a first portion separated from the leading edge of the write pole by a first downtrack distance. The magnetic shield includes second and third portions offset from the write pole in first and second cross track directions, the first and second portions separated from the leading edge by a second downtrack distance that is less than the first downtrack direction.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 2 is a media-facing surface view of the write transducer according to an example embodiment;

FIGS. 3-6 are diagrams of return poles according to additional embodiments;

DETAILED DESCRIPTION

Figure 1A:
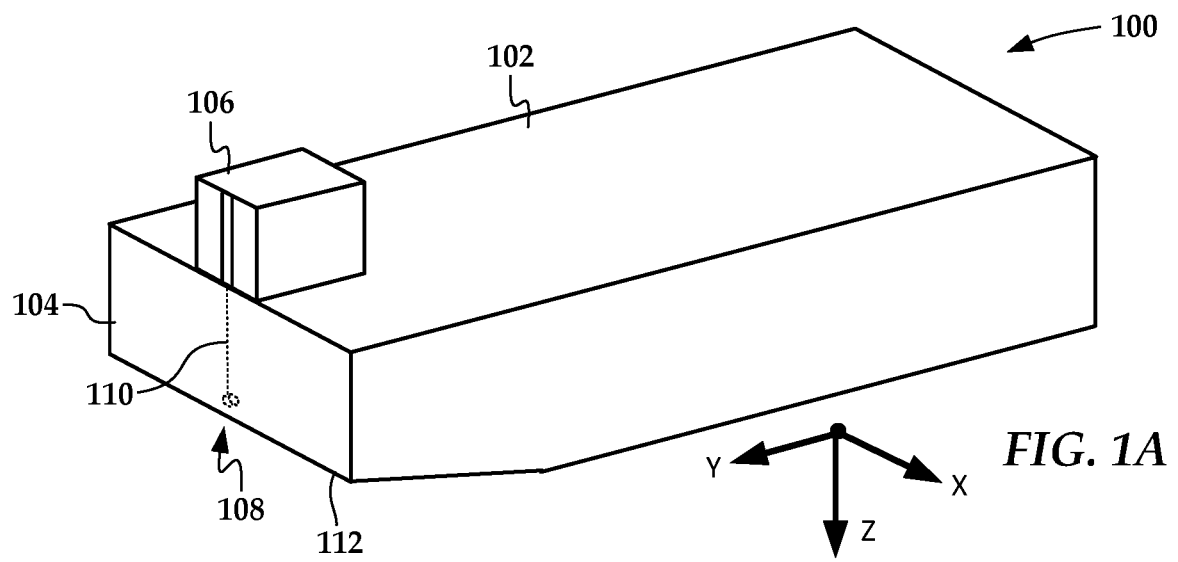
FIG. 1A is a perspective view of a recording head according to an example embodiment.

The present disclosure is generally related to assisted magnetic recording. One example of this is heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and illuminates the near-field transducer. In response to the illumination, the near-field transducer generates surface plasmons that are directed (via the shape of the transducer) out of the recording head to create the hotspot on the recording medium. The embodiments described below may be applicable to other assisted magnetic recording technologies, such as microwave assisted magnetic recording (MAMR).

One challenge in developing in HAMR products involves providing efficient magnetic flux closure for the write pole. A large portion of the space around the near field transducer (NFT) and its optical path, (currently located on the leading edge of the write pole) is essentially off-limits to magnetic structures as this may cause unacceptable degradation of the optical performance.

There are designs that channel the flux through the trailing edge shield or through the side shields. The terms "leading" and "trailing" as used herein refer to an order in which the recording medium passes under components. So a leading edge of a component will traverse a portion the media before the trailing edge of the same component. The leading and trailing edges are offset in a downtrack direction. The side shields are offset in a crosstrack direction from the magnetic pole and other components.

Designs that channel the flux through the trailing edge shield or through the side shields can substantially reduce the saturation current and the rise-time associated with the write's operating conditions, but they do not provide any gain in terms of the maximum effective write field produced on the leading edge of the write pole. This is because the flux is reoriented towards the trailing edge and the field in the vicinity of the write pole's trailing edge has a dominant perpendicular component. Such designs can be considered if the writer to NFT spacing is very small, however when it is comparable to 50 nm, any substantial gains in saturation current/rise-time will likely result in comparable degradation of the maximum achievable field. An alternative is to have thick soft underlayer (SUL) in the media, which beginning with 80 nm of thickness can conduct the flux with efficiency comparable to that of a magnetic shield. However, in this case the price of media can increase considerably.

Thus, the leading shield remains a desirable and practical flux closure path for the HAMR writer. In principle, for the leading shield placed close to the write pole, the trailing shield can also be brought up closer (realistically up to 250-500 nm) without the above-mentioned risks. The difficulty of implementing a leading shield design is possible interference with the optical path and/or elevated temperature hot spots created along its edge in the proximity to near field transducer (NFT).

In this application, a leading shield is proposed in which an opening is made to accommodate the optical system. It is expected that in most cases this would comprises a central gap with side plates coming closer to the write pole. In terms of the optimal configuration it appears that for 50 nm write pole to the NFT spacing the leading shield 150-200 nm away from the write pole produces the optimal field angle and thus the highest effective field. For 30 nm NFT to pole spacing this optimal dimension is reduced to 125-175 nm.

In reference now to FIG. 1A, a perspective view shows a recording head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 (also referred to as the air-bearing surface, or ABS) to create a small hot spot in the recording medium.

Figure 1B:
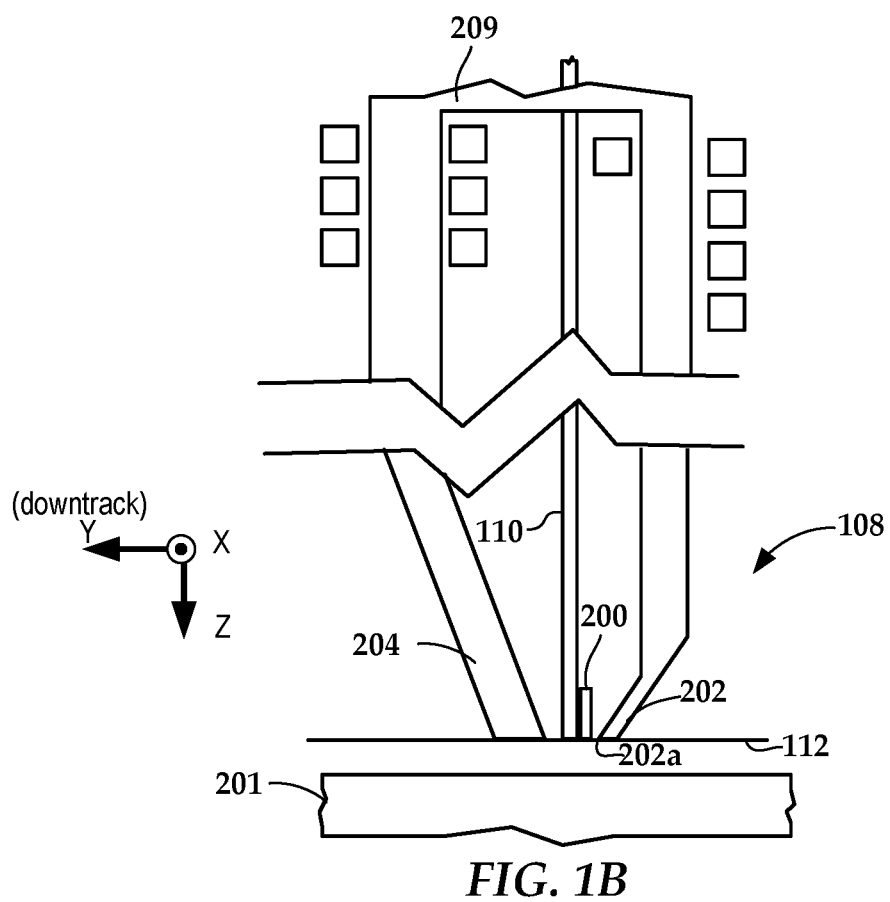
FIG. 1B is a cross-sectional view of a write transducer according to an example embodiment.

In FIGS. 1B and 2, diagrams show respective cross section and media-facing surface views of the read/write transducer 108 according to an example embodiment. The read/write transducer 108 includes a near-field transducer 200 proximate the media facing surface. For other types of technologies, e.g., MAMR, the near-field transducer 200 may be replaced by a spin torque oscillator or the like. A write pole 202 has a leading edge 202a proximate to the near-field transducer 200 at the media facing surface. A magnetic shield 204 faces the leading edge 202a of the write pole 202 and is magnetically coupled thereto (e.g., via a yoke 209 located away from the media-facing surface as well as by recording medium 201).

As best seen in FIG. 2, the magnetic shield 204 includes a first portion 204a separated from the leading edge 202a by a first downtrack distance 212, which is the sum of gap depth 208 and write pole to leading shield distance 210. The magnetic shield 204 includes second and third portions 204a, 204b offset from the write pole 202 in first and second cross track directions. The first and second portions are separated from the leading edge 202a by a second downtrack distance 210 that is less than the first downtrack direction 212. Portions 204a, 204b and 204c are covered by a gold (or other low-loss) optical layer. This shielding may also extend to other parts of the magnetic shield near the waveguide 110 and near-field transducer 200. This ensures the magnetic leading shield 204 is optically shielded from direct coupling to waveguide 110.

In this example, the first, second and third portions 204c-204b form a rectangular notch 211 that faces the near-field transducer 200. The rectangular notch is filled with a dielectric and has a downtrack depth 208 and crosstrack width 211. In other embodiments, the boundaries of such a notch can be curved, semicircular, triangular, trapezoidal, etc. Alternate embodiments of leading shields 300-303 with respective notches 310-313 are shown in FIGS. 3-6, where each leading shield is shown with a corresponding indication of the downtrack notch depth 320-323 and crosstrack notch width 330-333. The optimal shapes of the leading shields in FIGS. 2-6 are dependent on the shape of an NFT that is used with the shield. Recent introduction such as optical shields and mini-solid-immersion-mirror (mini-SIM) NFT designs enables the use of a magnetic shield as shown in these figures. In these recent NFT designs, optical shields (and mini-SIM) features have been added to confine the light in the core/waveguide 110 in the cross track direction, and shield the media from any light source other than the NFT peg.

Figure 7:
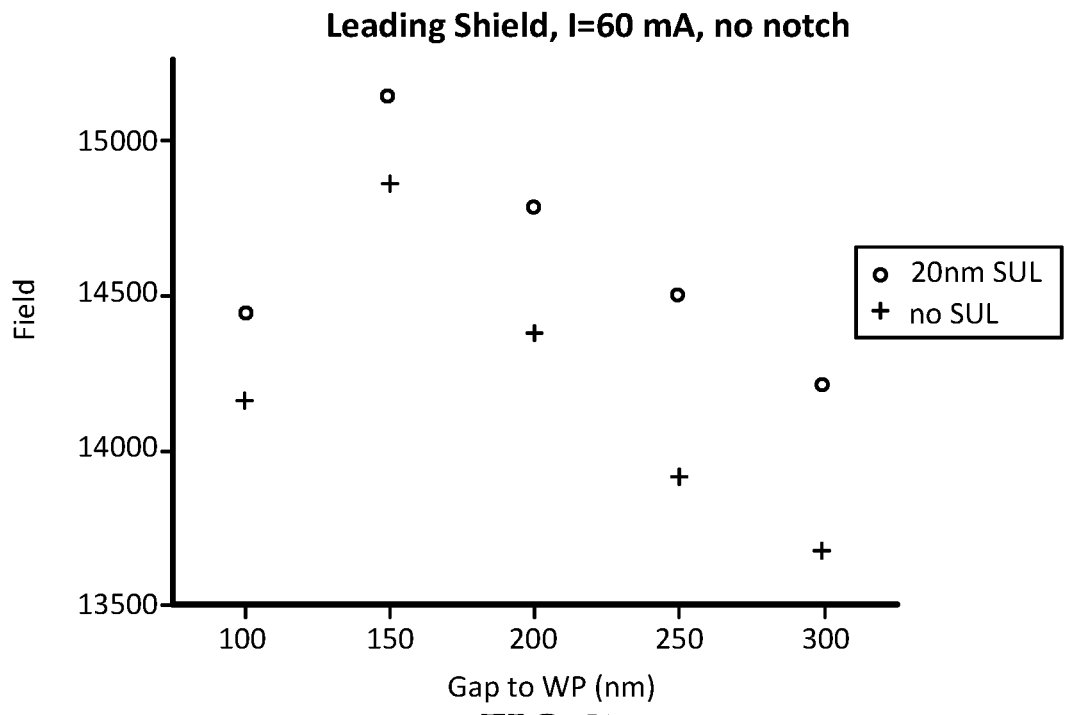
FIGS. 7-9 are graphs showing simulations of a write transducer with a return pole according to an example embodiment.
Figure 8:
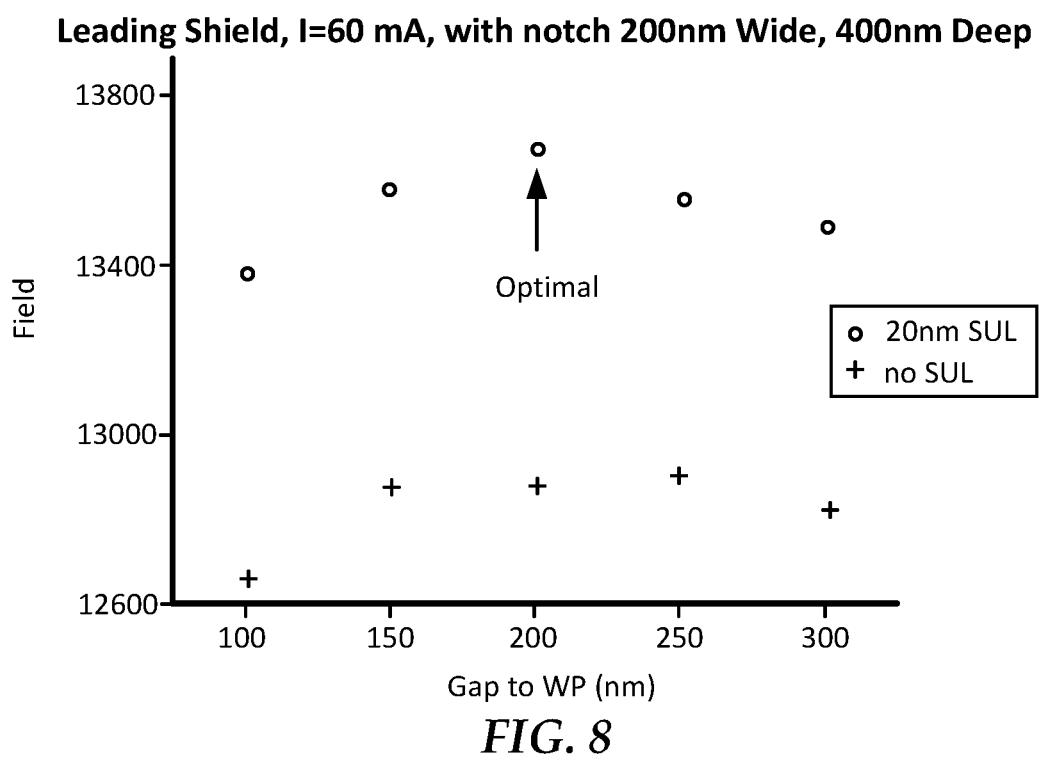

Generally, an assisted magnetic recording head can use a leading shield in which an opening is made to accommodate the optical system. This allows inserting a magnetic leading shield under these optical (e.g., gold) shields. This improves magnetic flux path while avoiding direct coupling to the light, which would cause large optical absorption, increased temperature and thus head degradation. It is expected that in most cases the shield opening would include a central gap with side plates coming closer to the write pole. In terms of the optimal configuration it appears that for a 50 nm write pole to NFT spacing (dimension 214 in FIG. 2), the leading shield to write pole leading edge distance (distance 210 in FIG. 2) would be around 150-200 nm. This spacing would produce the optimal field angle and thus the highest effective field. A summary of analyses of the 50 nm spacing configurations is shown in the graphs of FIGS. 7 and 8, which simulated the magnetic recording media with and without a 20 nm soft underlayer (SUL). For a 30 nm NFT-to-pole spacing 214, this optimal distance 210 is reduced to about 125-175 nm.

The spacing 210 may be adjusted due to process and optical design limitations, e.g., how much magnetic material and how close to the write pole can this material be. It appears beneficial to keep the close point of the shield at least 200 nm from the write pole in the downtrack direction, while opening the gap to 200-300 nm or so with the depth of notch in the shield as small as allowed without interfering with the optical core (e.g., 500 nm). This may be preferable compared to moving the entire leading shield 400-500 nm or even further away from the write pole. As shown in Table 1 below, compared to a flat leading shield design, the notched or forked leading shield increases performance in terms of almost all relevant parameters—static write field, risetime and saturation current.

TABLE 1

Modeled parameters for trailing and leading shield-based designs

| | Baseline thick SUL LS 400 nm to WP | Baseline thick SUL LS 800 nm to WP | Baseline thin SUL LS 800 nm to WP | Trailing shield based flux closure | Leading shield with opening optimized on thin SUL |
|---|---|---|---|---|---|
| Write field above saturation | 16000 | 14500 | 11000 | 11500 | 14500 |
| Saturation current | 46 mA | 62 mA | 71 mA | 58 mA | 52 mA |
| Field at 60 mA | 17000 | 13300 | 9800 | 11900 | 15200 |
| Write field/side field | 1.06 | 1.06 | 1.04 | 0.97 | 1.03 |
| Risetime at 120 mA | 231 ps | 284 ps | 341 ps | 183 ps | 245 ps |

Figure 9:
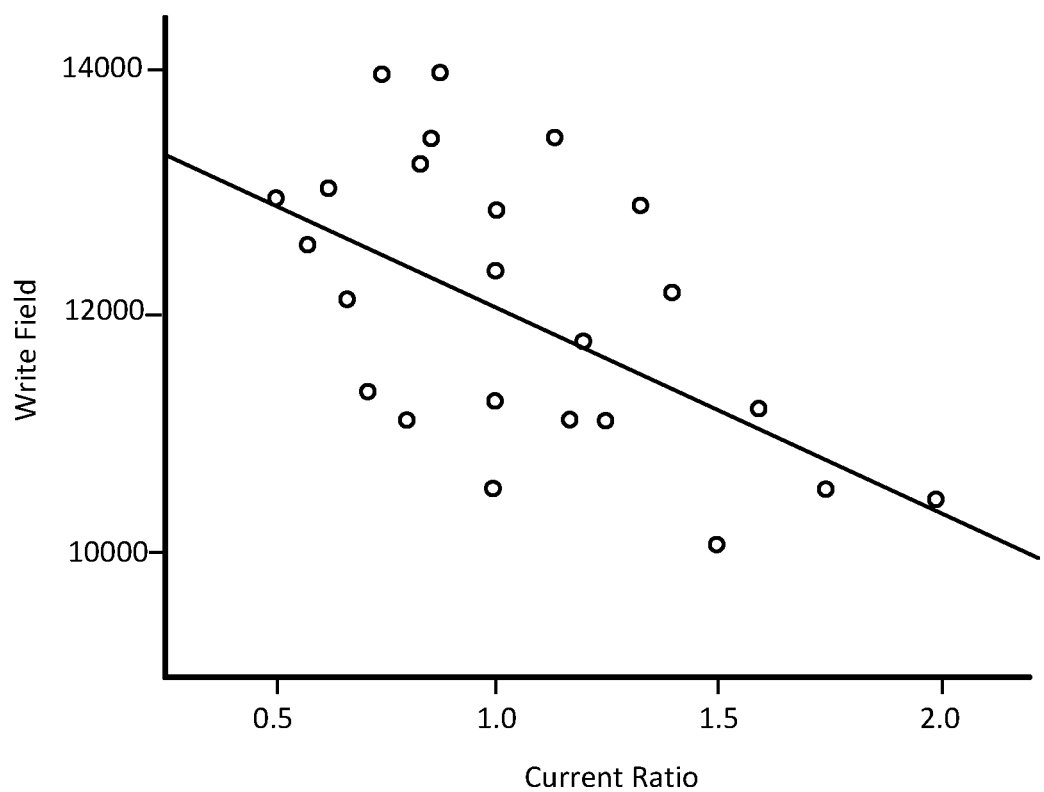

Additional gain can be achieved by purposely unbalancing the coils magnetomotive force (MMF), which can be accomplished by applying different currents (amplitude or the entire shape including in particularly the overshoot region) to leading and trailing coil turns. Modeling results of this are shown in FIG. 9. The unbalance can also compensate for the write field angle loss due to relatively close proximity of the trailing edge. An improved unbalanced system is likely to have: denser (closer to the ABS) leading edge coils for the purpose of having larger contribution to the write pole dynamics; reduced number of turns on the trailing compared to the leading side, or the current levels larger on the leading vs. trailing side; trailing shield brought to within 500 nm or thereabout from the write pole in order to boost overall efficiency of the trailing path, which helps the dynamic efficiency; and forked leading shield as the main path for the flux to close in the vicinity of the writing point in the media.

Figure 10:
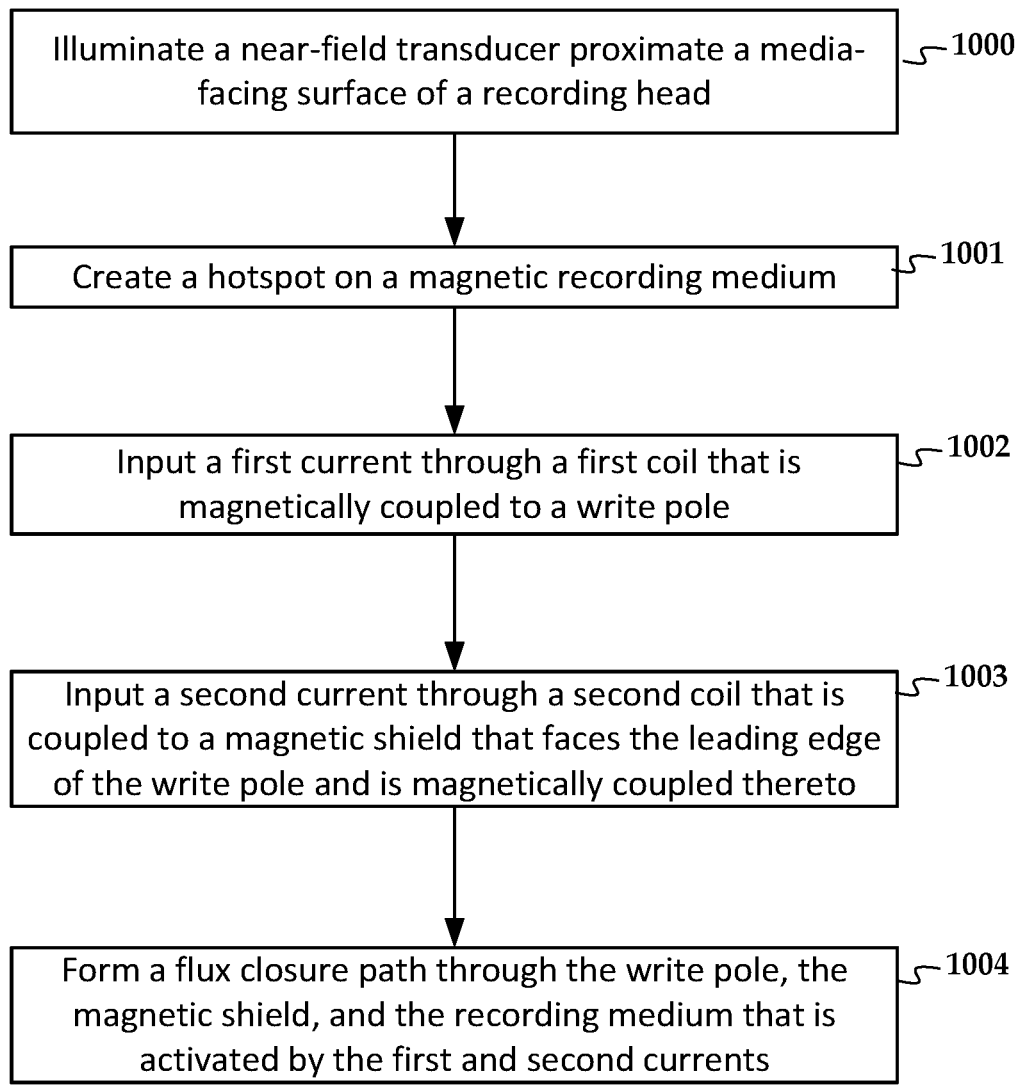
FIG. 10 is a flowchart of a method according to an example embodiment.

In FIG. 10, a flowchart illustrates a method according to an example embodiment. The method involves illuminating 1000 a near-field transducer proximate a media-facing surface of a recording head. The near-field transducer causes surface plasmons to create 1001 a hotspot on a magnetic recording medium in response to the illumination. A first current is input 1002 through a first coil that is magnetically coupled to a write pole. The write pole has a leading edge proximate to and facing the near-field transducer at the media-facing surface. A second current is input 1002 through a second coil that is coupled to a magnetic shield that faces the leading edge of the write pole and is magnetically coupled thereto. Note that the first and second currents may be the same, e.g., where the first and second coils are wired in series. The magnetic shield has a notch centered over the near-field transducer that reduces interference with the near-field transducer. The write pole, the magnetic shield, and the recording medium form 1004 a flux closure path that is activated by the first and second currents.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A recording head comprising:
a near-field transducer proximate a media-facing surface of the recording head;
a write pole having a leading edge proximate to and facing the near-field transducer at the media-facing surface;
a first coil that is magnetically coupled to the write pole;
a magnetic shield facing the leading edge of the write pole at the media-facing surface and magnetically coupled thereto, the magnetic shield comprising:
a first portion separated from the leading edge of the write pole by a first downtrack distance; and
second and third portions offset from the write pole in first and second cross track directions, the first and second portions separated from the leading edge by a second downtrack distance that is less than the first downtrack distance; and
a second coil that is magnetically coupled to the magnetic shield, wherein the write pole and the magnetic shield form a flux closure path that is activated by first and second currents respectively applied to the first and second coils.

2. The recording head of claim 1, wherein a crosstrack gap between the second and third portions of the magnetic shield is between 200 nm and 300 nm.

3. The recording head of claim 1, wherein the second downtrack distance is at least 125 nm.

4. The recording head of claim 1, wherein the first downtrack distance is greater than 400 nm.

5. The recording head of claim 1, wherein the first, second and third portions form a notch that faces the near-field transducer, the notch being filled with a dielectric.

6. The recording head of claim 5, wherein the notch comprises a rectangular, triangular, semicircular, or trapezoidal notch.

7. The recording head of claim 1, wherein the first, second and third portions are covered by a low-loss optical layer.

8. The recording head of claim 7, wherein the low-loss optical layer comprises gold.

9. The recording head of claim 1, wherein the first current and second currents are different, resulting in an unbalanced magnetomotive force applied by the first and second coils.

10. A recording head comprising:
a near-field transducer proximate a media-facing surface of the recording head;
a waveguide that delivers light to the near-field transducer;
a write pole having a leading edge proximate to and facing the near-field transducer at the media-facing surface;
a first coil that is magnetically coupled to the write pole;
a magnetic shield facing the leading edge of the write pole at the media facing surface and magnetically coupled to the write pole and optically shielded from the waveguide, the magnetic shield comprising a notch centered over the near-field transducer, the notch being wider in a downtrack direction than the near-field transducer at the media facing surface, and
a second coil that is magnetically coupled to the magnetic shield, wherein the write pole and the magnetic shield form a flux closure path that is activated by first and second currents respectively applied to the first and second coils.

11. The recording head of claim 10, wherein a crosstrack dimension of the notch is between 200 nm and 300 nm.

12. The recording head of claim 10, wherein a downtrack dimension of the notch is at least 125 nm.

13. The recording head of claim 10, wherein the notch comprises a rectangular, triangular, semicircular, or trapezoidal notch.

14. The recording head of claim 10, wherein the optical shielding is provided by a low-loss optical layer covering a portion of the magnetic shield near the media-facing surface.

15. The recording head of claim 10, wherein the first current and second currents are different, resulting in an unbalanced magnetomotive force applied by the first and second coils.

16. A method comprising:
illuminating, via a waveguide, a near-field transducer proximate a media-facing surface of a recording head, the near-field transducer causing surface plasmons to create a hotspot on a magnetic recording medium in response to the illumination;

input a first current through a first coil that is magnetically coupled to a write pole, the write pole having a leading edge proximate to and facing the near-field transducer at the media-facing surface; and input a second current through a second coil that is coupled to a magnetic shield that faces the leading edge of the write pole and is magnetically coupled thereto, the magnetic shield comprising a notch centered over the near-field transducer, the magnetic shield coated with a low-loss optical layer that reduces interference with the waveguide, the write pole, the magnetic shield, and the recording medium forming a flux closure path that is activated by the first and second currents.

17. The method of claim 16, wherein the first current is greater than the second current.

18. The method of claim 16, wherein the first current and second currents are different, resulting in an unbalanced magnetomotive force applied by the first and second coils.

* * * * *